US012619522B2

(12) United States Patent
Yagami et al.

(10) Patent No.: US 12,619,522 B2
(45) Date of Patent: May 5, 2026

(54) INFORMATION PROCESSING DEVICE, INFORMATION PROCESSING METHOD, AND INFORMATION PROCESSING SYSTEM

(71) Applicant: SONY GROUP CORPORATION, Tokyo (JP)

(72) Inventors: Kishin Yagami, Tokyo (JP); Tatsuo Nagamatsu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 292 days.

(21) Appl. No.: 18/546,778

(22) PCT Filed: Dec. 28, 2021

(86) PCT No.: PCT/JP2021/048935
§ 371 (c)(1),
(2) Date: Aug. 16, 2023

(87) PCT Pub. No.: WO2022/181052
PCT Pub. Date: Sep. 1, 2022

(65) Prior Publication Data
US 2024/0134783 A1    Apr. 25, 2024
US 2024/0232061 A9    Jul. 11, 2024

(30) Foreign Application Priority Data

Feb. 24, 2021    (JP) ................................. 2021-027165

(51) Int. Cl.
*G06F 11/3668* (2025.01)
*G06F 8/75* (2018.01)

(52) U.S. Cl.
CPC ............ *G06F 11/3688* (2013.01); *G06F 8/75* (2013.01)

(58) Field of Classification Search
CPC ............................... G06F 8/75; G06F 11/3688
(Continued)

(56) References Cited

U.S. PATENT DOCUMENTS 10,402,310 B1 *    9/2019    Kjellin .................... G06F 16/13
10,606,739 B2 *    3/2020    Kakkad .................... G06F 8/77
(Continued)

FOREIGN PATENT DOCUMENTS

JP        2019-168753 A    10/2019

OTHER PUBLICATIONS

Ying et al., "Predicting Source Code Changes by Mining Change History", 2004, IEEE, pp. 574-586. (Year: 2004).*
(Continued)

*Primary Examiner* — Ted T. Vo
(74) *Attorney, Agent, or Firm* — CHIP LAW GROUP

(57)        ABSTRACT

Provided is an information processing device that performs processing regarding a code analysis of software that is in an intermediate state. The information processing device includes a difference information acquisition section and a code analysis section. The difference information acquisition section acquires difference information regarding the difference between a code stored in a first repository and a code stored in a second repository in correspondence with the code stored in the first repository. The code analysis section reproduces the code stored in the first repository from the code stored in the second repository, in reference to the difference information, and performs code analysis on the reproduced code. The information processing device reports the result of analysis by the code analysis section to the developer of the reproduced code.

13 Claims, 14 Drawing Sheets

(58) Field of Classification Search
USPC ................................................ 717/124–131
See application file for complete search history.

(56)                     References Cited

U.S. PATENT DOCUMENTS

| | | | |
|---|---|---|---|
| 11,200,053 B2* | 12/2021 | Smith ................. | G06F 11/3466 |
| 2012/0123981 A1* | 5/2012 | Graves ............... | G06F 16/2462 |
| | | | 707/693 |
| 2015/0186253 A1* | 7/2015 | Abraham ............ | G06F 11/3409 |
| | | | 717/124 |
| 2020/0104121 A1 | 4/2020 | Morgan | |
| 2020/0150953 A1* | 5/2020 | Smith ....................... | G06F 8/75 |

OTHER PUBLICATIONS

Gerlec et al., "Mining source code changes from software repositories", 2011, IEEE, (Year: 2011).*
International Search Report and Written Opinion of PCT Application No. PCT/JP2021/048935, issued on Mar. 29, 2022, 06 pages of ISRWO.
Takano, et al., "A Super-Introduction to GitHub that is in time now", Nikkei Systems, No. 309, Dec. 14, 2018, pp. 42-51.
Althoff, et al., "Self-study programmer from the basics of the Python language to how to work", Nikkei BP, Feb. 26, 2018, pp. 222-236.
Otake, et al., "CircleCI for the first time. Building a powerful CI/CD environment by making full use of modern functions", Web+DB Press, vol. 107, Nov. 7, 2018, pp. 10-12.
Machalica, et al., "Predictive Test Selection", May 29, 2019, 10 pages.
Leong, et al., "Assessing Transition-based Test Selection Algorithms at Google", International Conference on Software Engineering (2019), May 25-31, 2019, 3 pages.

* cited by examiner

F I G . 1
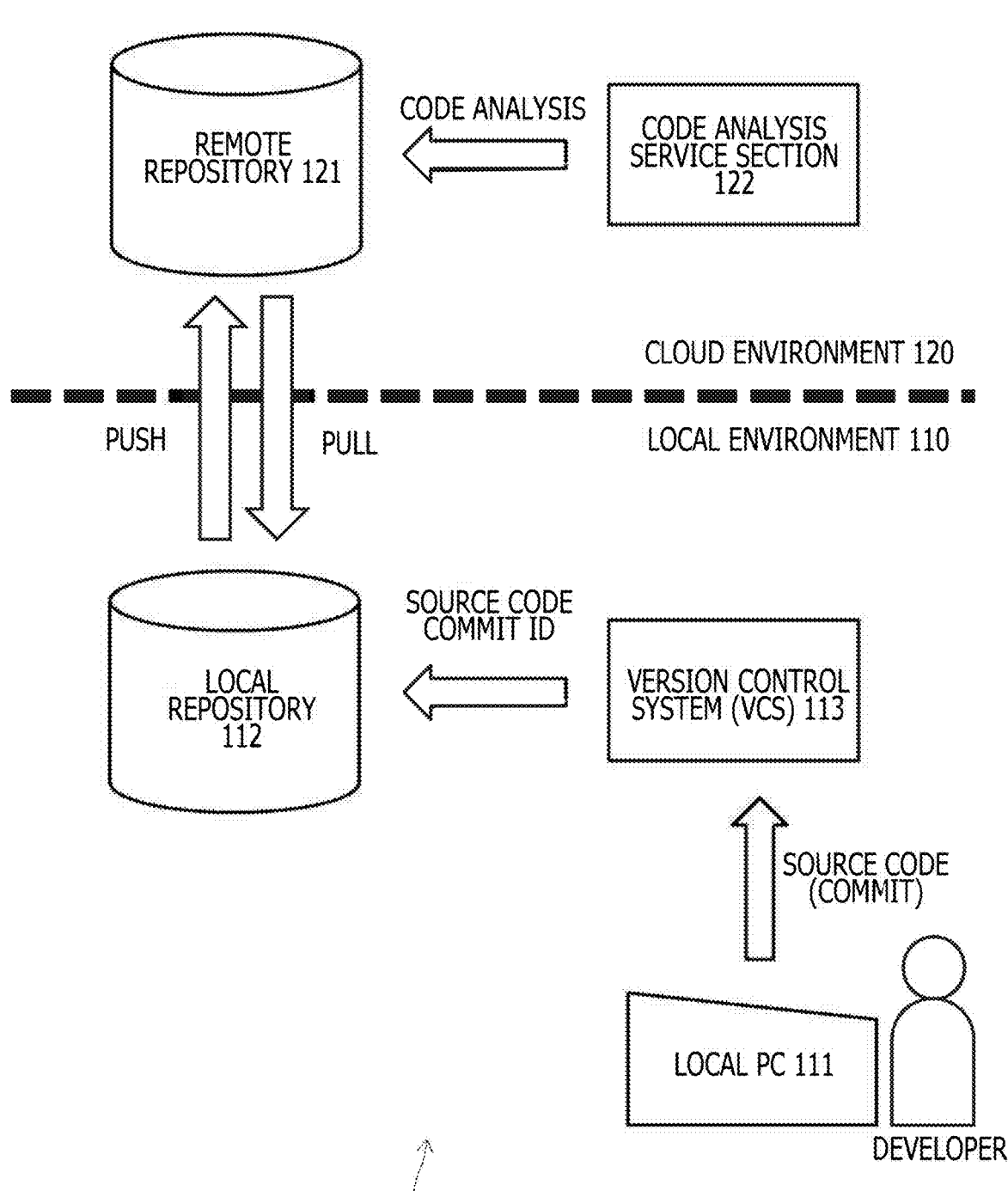
SOFTWARE DEVELOPMENT ENVIRONMENT 100

F I G . 2

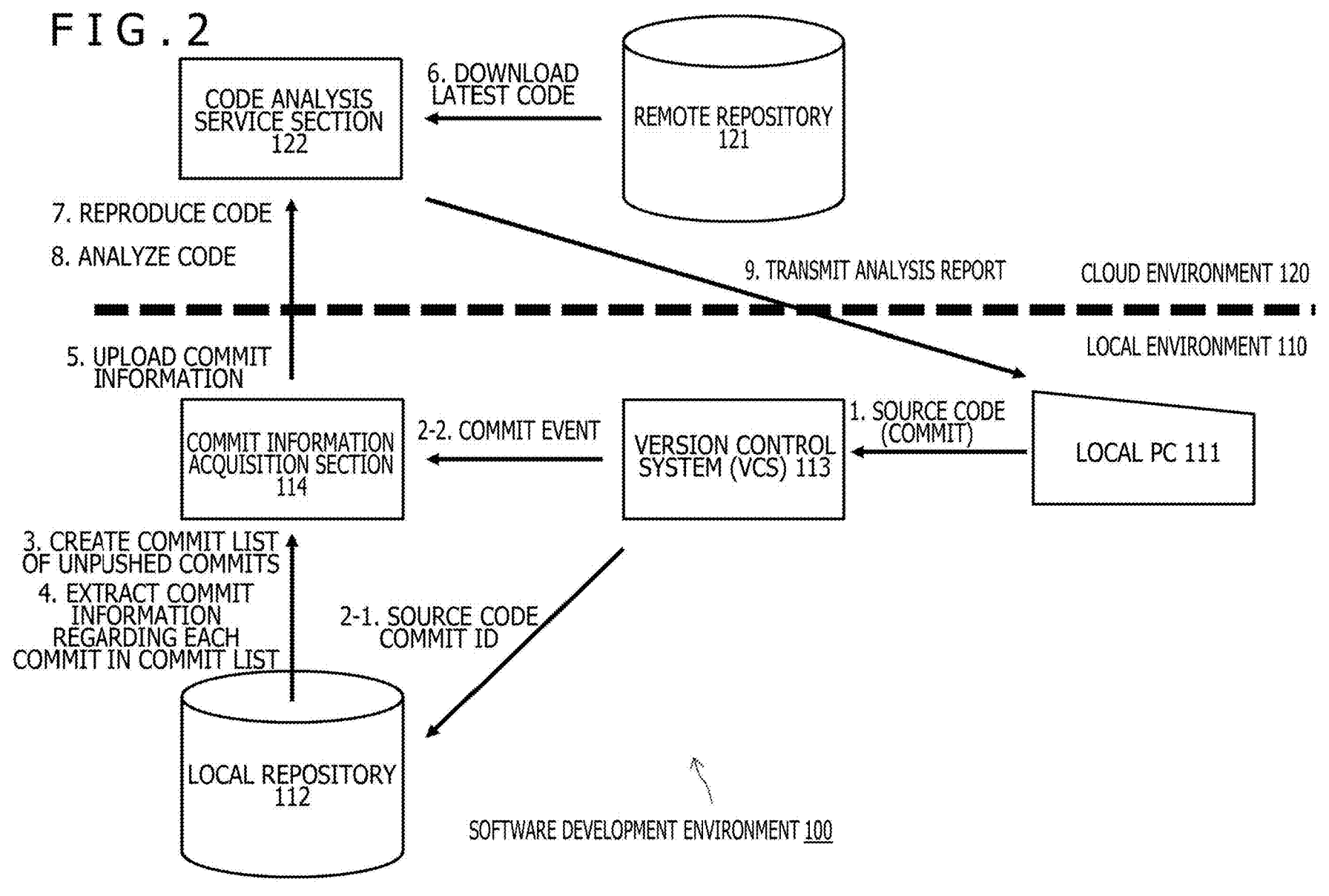

CLOUD ENVIRONMENT 120

LOCAL ENVIRONMENT 110

LOCAL PC 111

1. SOURCE CODE
(COMMIT)

VERSION CONTROL
SYSTEM (VCS) 113

2-1. SOURCE CODE
COMMIT ID 2-2. COMMIT EVENT

SOFTWARE DEVELOPMENT ENVIRONMENT 100

REMOTE REPOSITORY
121

6. DOWNLOAD
LATEST CODE

9. TRANSMIT ANALYSIS REPORT

CODE ANALYSIS
SERVICE SECTION
122

7. REPRODUCE CODE

8. ANALYZE CODE

5. UPLOAD COMMIT
INFORMATION

COMMIT INFORMATION
ACQUISITION SECTION
114

3. CREATE COMMIT LIST
OF UNPUSHED COMMITS

4. EXTRACT COMMIT
INFORMATION
REGARDING EACH
COMMIT IN COMMIT LIST

LOCAL REPOSITORY
112

F I G . 3
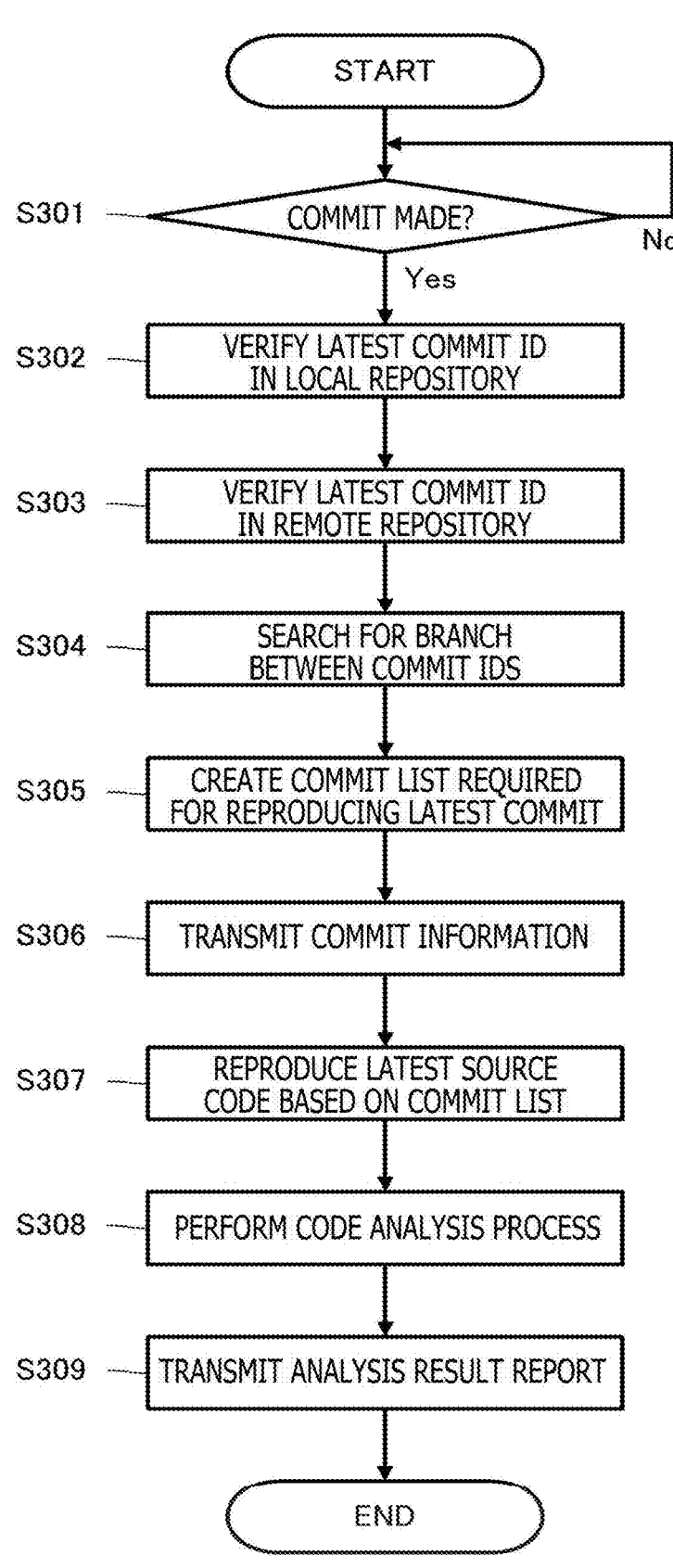

CHANGED FILE

TEST HISTORY

MACHINE LEARNING MODEL
601

PREDICTION BY
LEARNING MODEL

RULES

EVALUATION SECTION
602

SELECTED TEST CODE

TEST SELECTION SECTION 403

F I G . 7
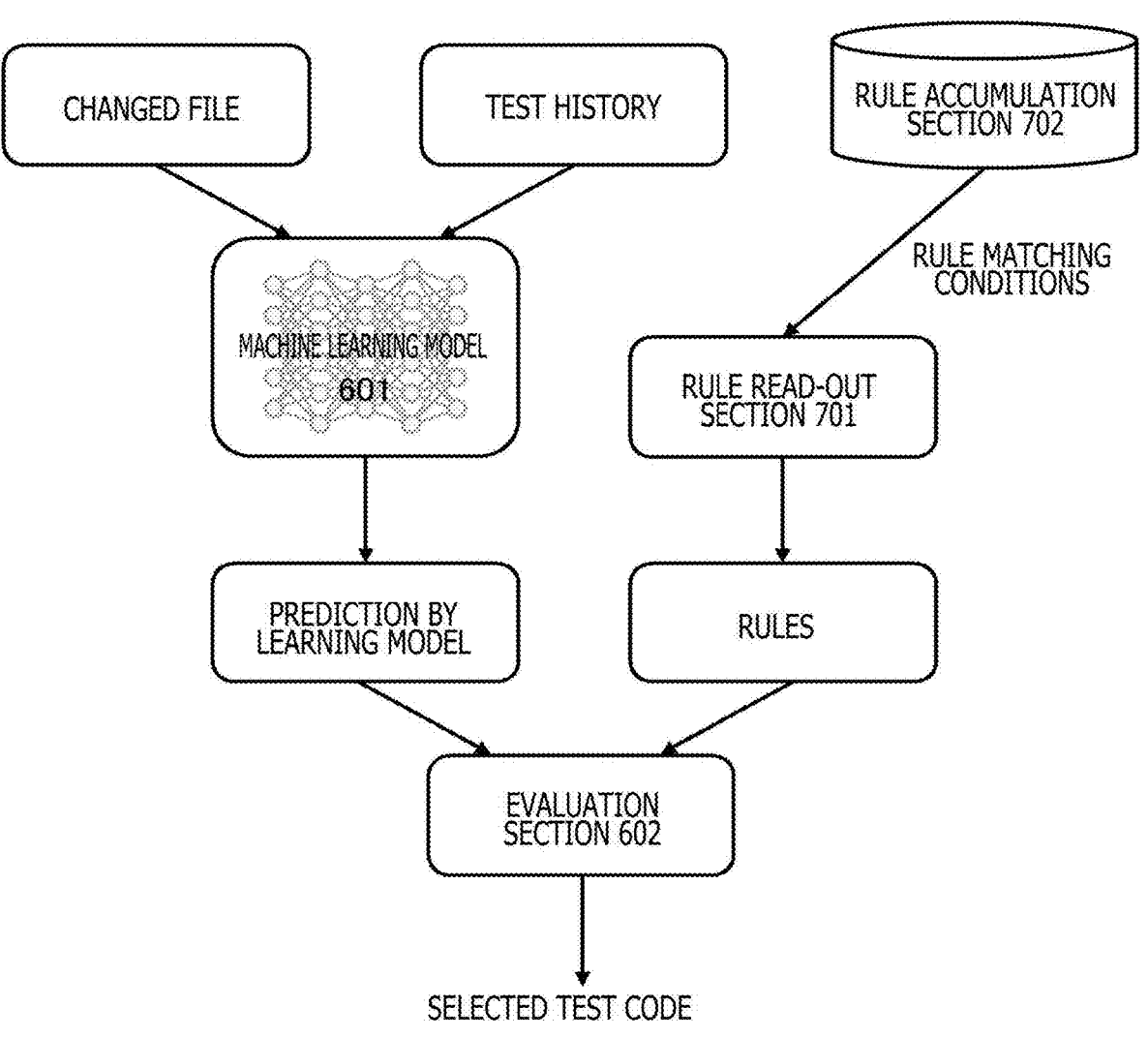

F I G . 8
| PROBABILITY OF FAILURE | TEST TARGET FILE |
|---|---|
| 0.0 | aaa/bbb/ccc_test.go |
| 0.1 | aaa/bbb/ddd_test.go |
| 0.9 | aaa/eee_test.go |
| 0.5 | aaa/fff/ggg_test.go |
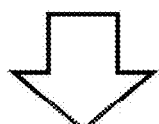
aaa/eee_test.go
aaa/fff/ggg_test.go F I G . 9
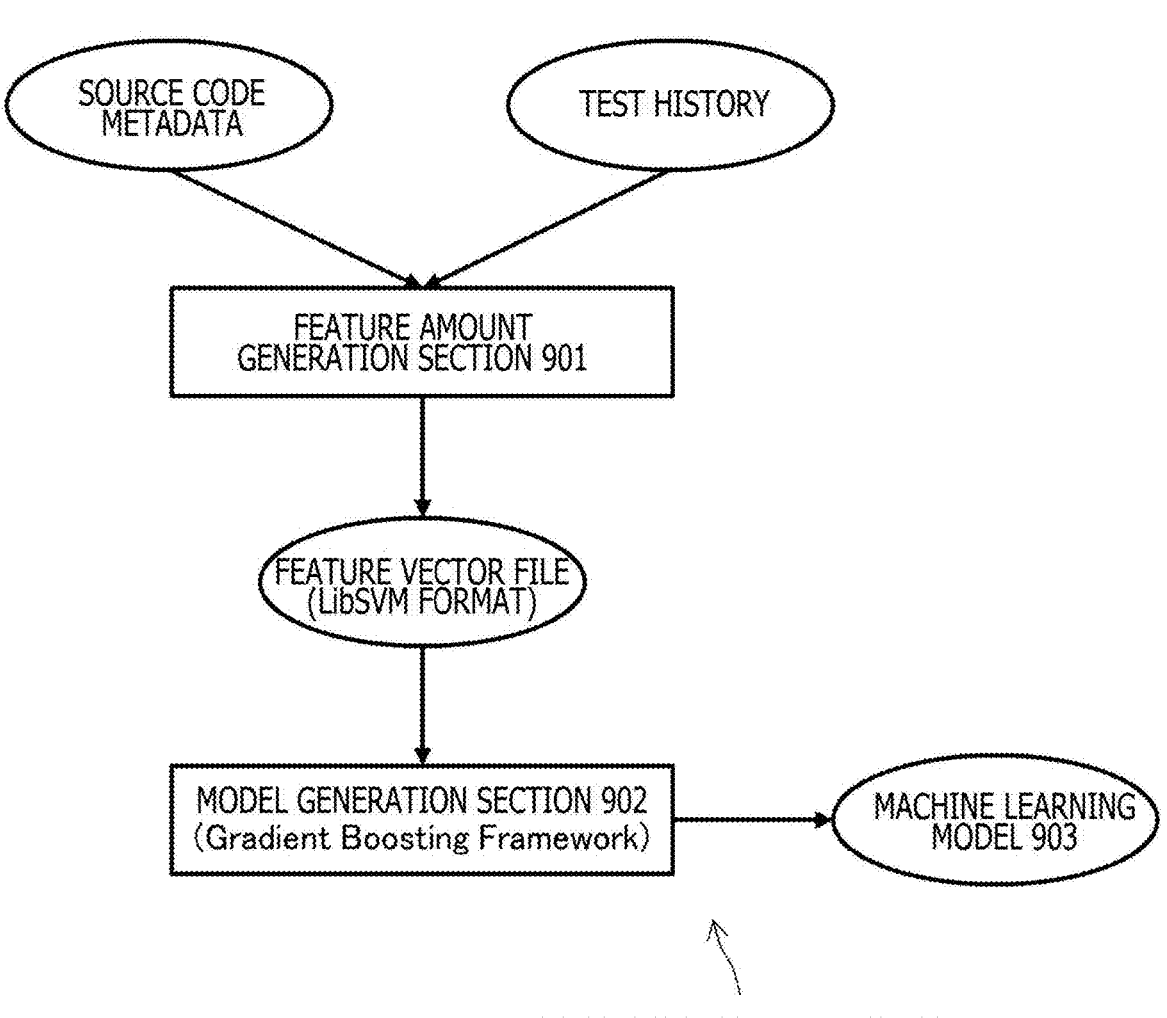

F I G . 1 0
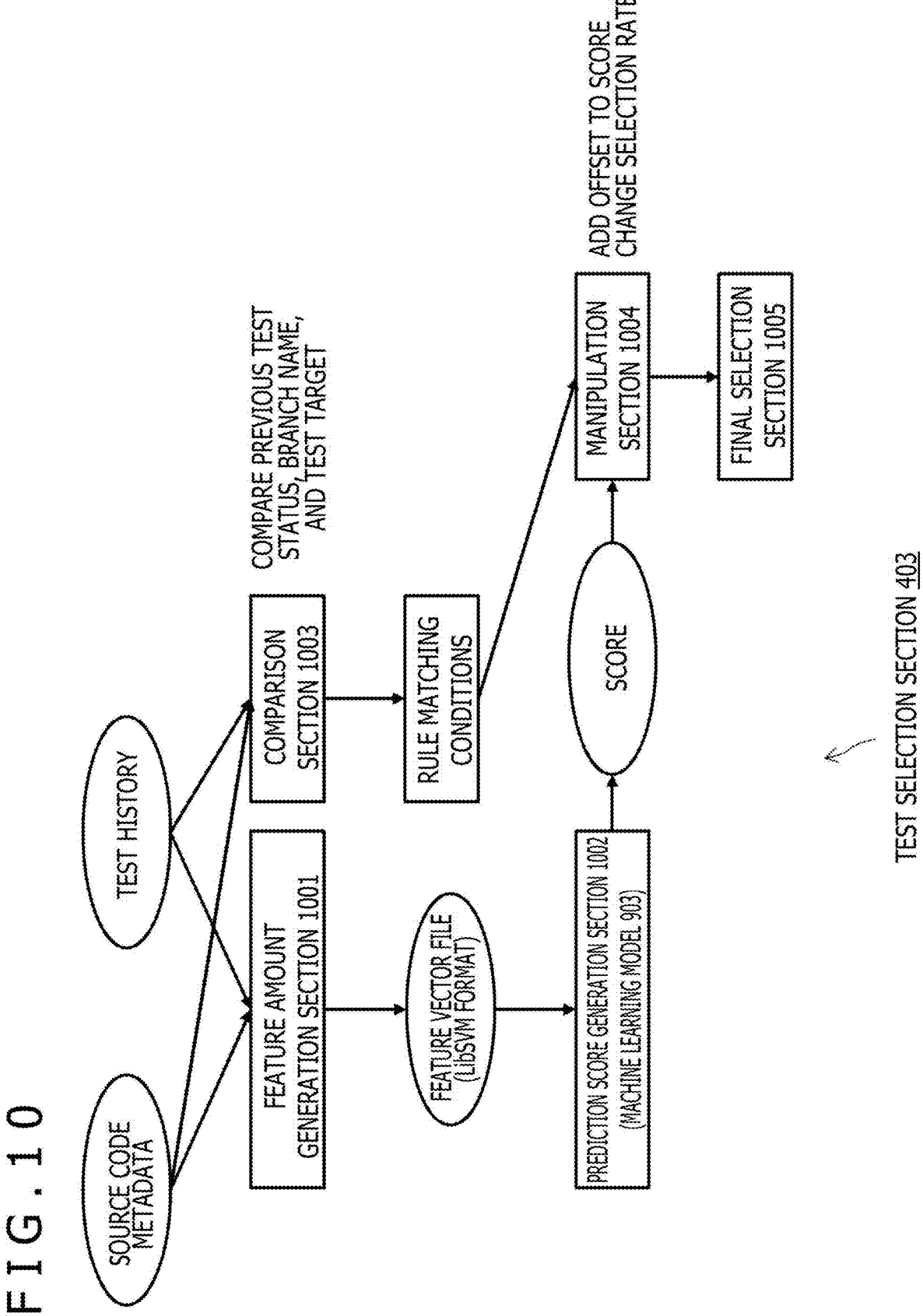

F I G . 1 1
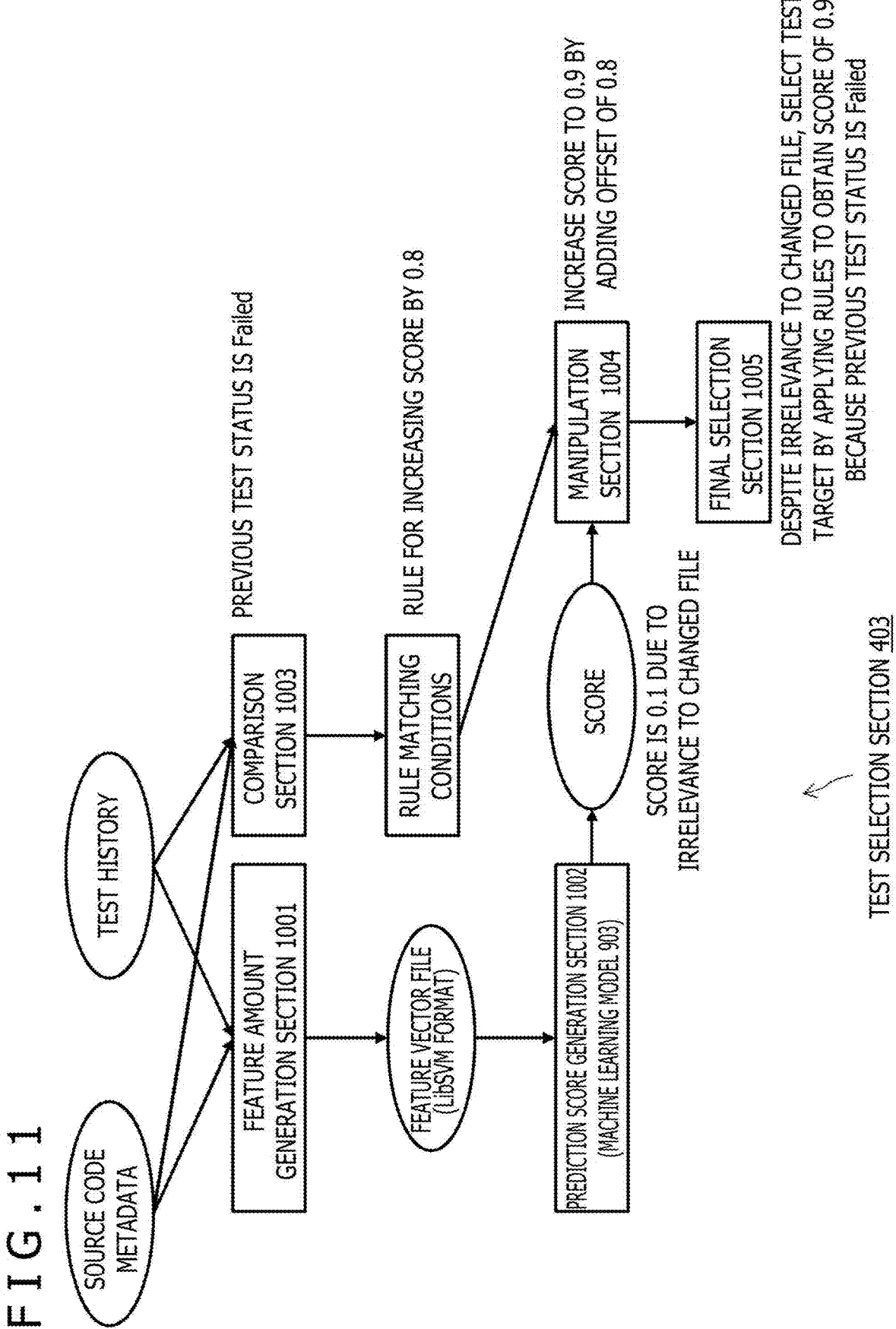

F I G . 1 2
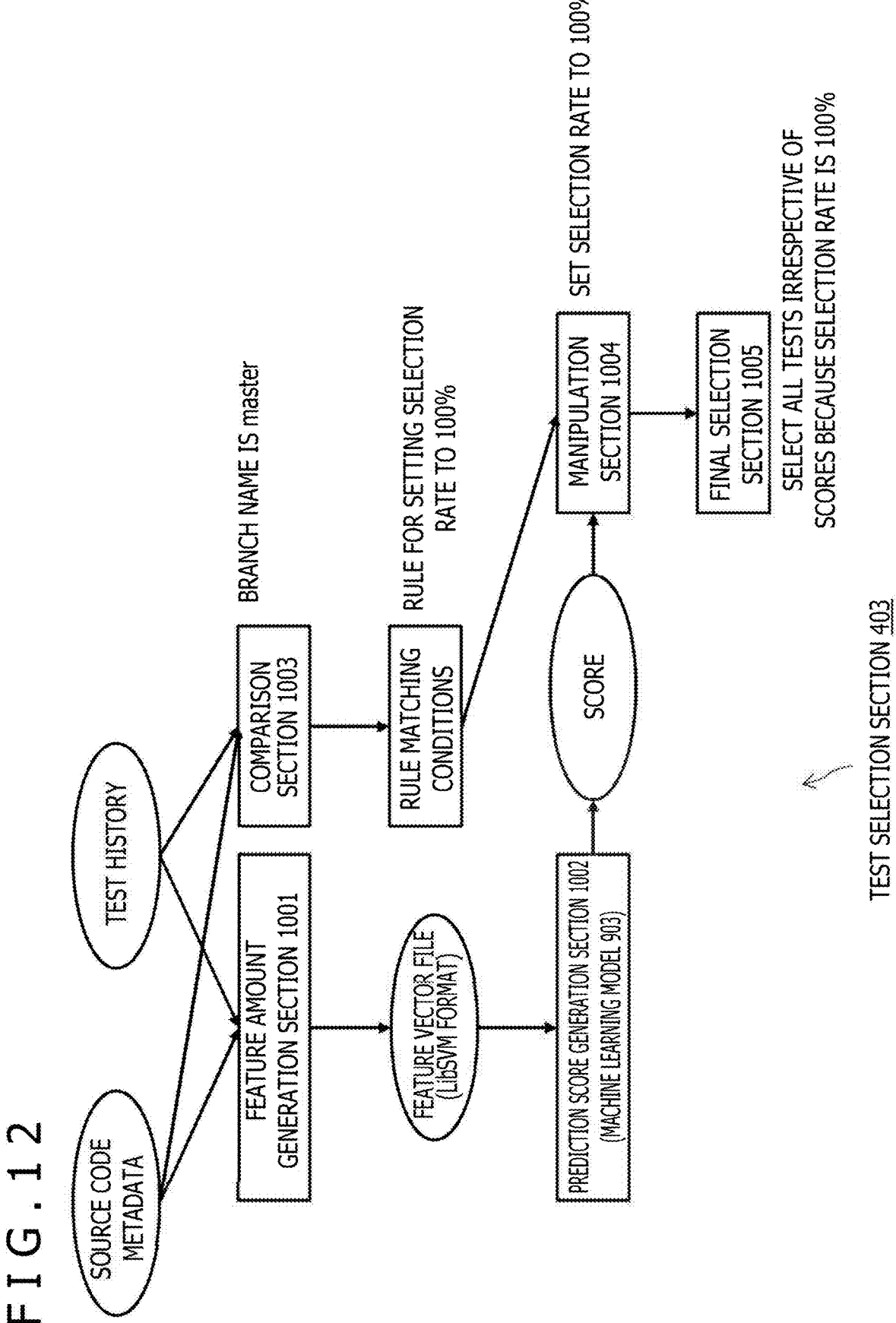

FIG.13

```
test-selection:
        - rule:
                name: select-all-test-for^-master-branch
                condition:
                        type: branch
                        value: master
                action:
                        type: selection-rate
                        value: 100
        - rule:

name: prioritize-failed-target-on-base-job
                condition:
                        type: base-job-status
                        value: failed
                action:

type: score-offset
                        value: 0.8
        - rule:
                name: prioritize-important-target
                condition:
                        type: target-patch
                        value: server/backend/critical/**
                action:
                        type: score-offset
                        value: 0.5
```

F I G . 1 4
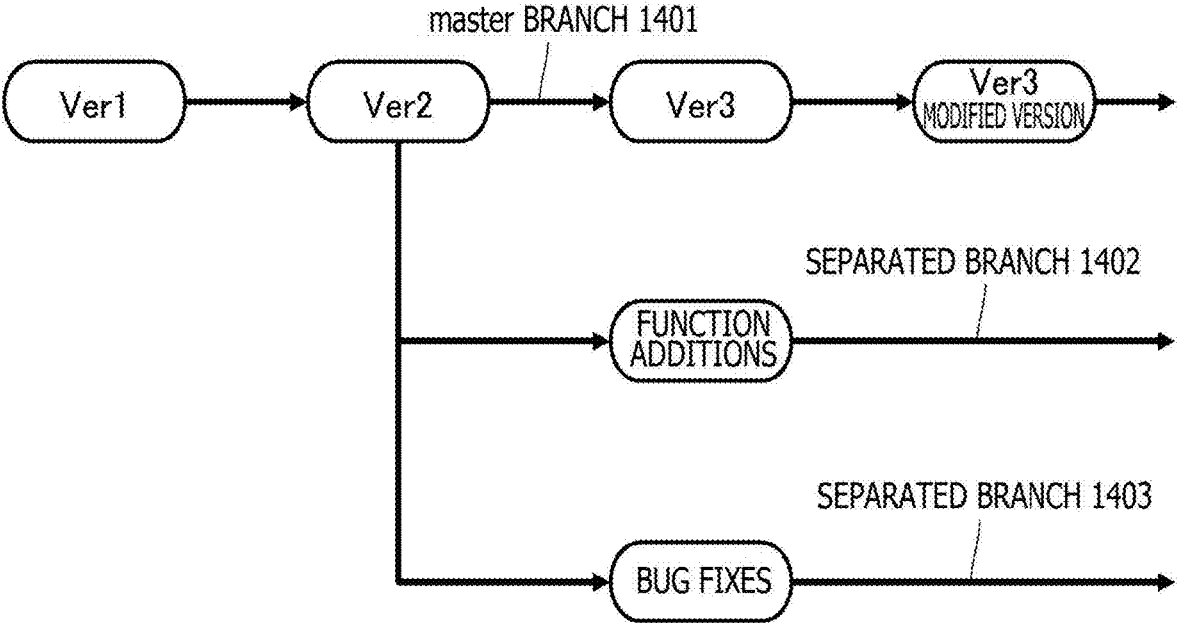

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2021/048935 filed on Dec. 28, 2021, which claims priority benefit of Japanese Patent Application No. JP 2021-027165 filed in the Japan Patent Office on Feb. 24, 2021. Each of the above-referenced applications is hereby incorporated herein by reference in its entirety.

TECHNICAL FIELD

The technology disclosed in this document (hereinafter referred to as the "present disclosure") relates to an information processing device, an information processing method, a computer program, and an information processing system that perform processing regarding a software code analysis.

BACKGROUND ART

In these days, with the development of ICT (Information and Communication Technology), the need for software is increasing more and more, and a large amount of software is being developed every day. It should be noted that software and computer programs referred to in this document are almost synonymous. Unless otherwise stated, the software and computer programs are assumed to be as developed by a developer, that is, in source code.

Code analysis is typically performed on developed software. The code analysis is performed to analyze a program control flow and structure, class inheritance, and relations between functions and variables, and verify function vulnerability (refer, for example, to PTL 1). Code analysis methods can roughly be classified into two types, that is, a method of performing code analysis with a local PC (Personal Computer) used by a software developer and a method of performing code analysis in a cloud environment.

Each time a commit is made (the contents of edited or updated files are updated) in a local environment, the former method of performing code analysis with a local PC is able to perform code analysis within a short period of time and report the result of the code analysis to a developer at an early stage. Recently, local PCs provide analysis functions similar to those provided by the cloud environment, but suffer from such problems as many functional limitations and limited computational resources. Meanwhile, the latter method of performing code analysis in the cloud environment is able to increase a computation speed by performing, for example, parallel processing through the effective use of abundant computational resources.

For example, CircleCI not only provides the service of performing code analysis in a cloud, but also provides a tool for performing code analysis with a local PC. Further, GitHub, Inc. provides the "GitHub Actions" service of executing CI and code analysis in the cloud. Moreover, a tool named "Act" for executing "GitHub Actions" in the local environment is provided by a third-party developer.

CITATION LIST

Patent Literature

PTL 1
    Japanese Patent Laid-open No. 2019-168753

Non Patent Literature

NPL 1
    Mateusz Machalica, Alex Samylkin, Meredith Porth, Satish Chandra, "Predictive Test Selection"
NPL 2
    Claire Leong, Abhayendra Singh, Mike Papadakis, Yves Le Traon, John Micco, "Assessing Transition-based Test Selection Algorithms at Google"

SUMMARY

Technical Problem

An object of the present disclosure is to provide an information processing device, an information processing method, a computer program, and an information processing system that perform processing regarding the code analysis of software that is in an intermediate state before being uploaded to the cloud environment.

Solution to Problem

In order to address the above-described problem, according to a first aspect of the present disclosure, there is provided an information processing device including a difference information acquisition section and a code analysis section. The difference information acquisition section acquires difference information regarding the difference between a code stored in a first repository and a code stored in a second repository in correspondence with the code stored in the first repository. The code analysis section reproduces the code stored in the first repository from the code stored in the second repository, in reference to the difference information, and performs code analysis on the reproduced code.

The difference information acquisition section acquires the difference information in reference to a list of commits that are not yet pushed to the second repository. More specifically, in a case where there is a branch in a code history, the difference information acquisition section acquires the difference information in reference to a list of commits necessary for reproducing the code in a latest form that is stored in the first repository from the branch.

Subsequently, the code analysis section reproduces the latest code stored in the first repository, in reference to information regarding individual commits included in the list of commits, and performs code analysis on the reproduced latest code.

Further, the code analysis section conducts a test by using a test code that is selected from multiple test codes defined with respect to the code. When making a test code selection, the code analysis section uses a machine learning model that has learned a history of changed files derived from code modification and a history of tests based on the test codes, and additionally adopts a rule-based selection.

According to a second aspect of the present disclosure, there is provided an information processing method including a difference information acquisition step and a code analysis step. The difference information acquisition step acquires difference information regarding the difference between a code stored in a first repository and a code stored in a second repository in correspondence with the code stored in the first repository. The code analysis step reproduces the code stored in the first repository from the code stored in the second repository, in reference to the difference information, and performs code analysis on the reproduced code.

According to a third aspect of the present disclosure, there is provided a computer program written in a computer-readable format for causing a computer to function as a difference information acquisition section and as a code analysis section. The difference information acquisition section acquires difference information regarding the difference between a code stored in a first repository and a code stored in a second repository in correspondence with the code stored in the first repository. The code analysis section reproduces the code stored in the first repository from the code stored in the second repository, in reference to the difference information, and performs code analysis on the reproduced code.

The computer program according to the third aspect of the present disclosure is obtained by defining a computer program that is written in a computer-readable format for implementing predetermined processing on a computer. That is, when the computer program according to the third aspect of the present disclosure is installed on the computer, collaborative operations are performed on the computer to provide operational advantages similar to those provided by the information processing device according to the first aspect of the present disclosure.

Further, according to a fourth aspect of the present disclosure, there is provided an information processing system including a commit information acquisition device and a code analysis device. The commit information acquisition device acquires commit information regarding a commit that represents the difference between the latest code developed in a local environment and a code corresponding to the latest code pushed to a remote repository. The code analysis device reproduces the latest code from a code pushed to the remote repository, in reference to the commit information acquired by the commit information acquisition device, and performs code analysis on the reproduced code.

However, the term "system" used in this document denotes a logical aggregate of multiple devices (or functional modules implementing specific functions), and is applicable no matter whether the individual devices and functional modules are within a single housing.

Advantageous Effect of Invention

The present disclosure provides an information processing device, an information processing method, a computer program, and an information processing system that perform processing regarding the code analysis of software on an individual commit basis.

It should be noted that the advantages described in this document are merely illustrative and not restrictive. Advantages provided by the present disclosure are not limited to those described in this document. Further, in some cases, the present disclosure can additionally provide advantages other than those described in this document.

Additional objects, features, and advantages of the present disclosure will be apparent from the following more detailed description based on a later-described embodiment and accompanying drawings.

BRIEF DESCRIPTION OF DRAWINGS

FIG. 1 is a diagram illustrating a software development environment 100 for software that is to provide a code analysis service in a cloud environment.

FIG. 2 is a diagram illustrating a procedure that is performed in the software development environment 100 to perform code analysis on a source code in an intermediate state of development.

FIG. 3 is a flowchart illustrating a procedure for performing code analysis on a source code that is in the intermediate state of development.

FIG. 7 is a diagram illustrating an example of an internal configuration of the test selection section 403 that applies a rule matching the conditions.

FIG. 8 is a diagram illustrating a specific example of making a test target file selection based on the probability of failure.

FIG. 9 is a diagram illustrating an example of a functional configuration of the test selection section 403 in a learning phase for generating the machine learning model.

FIG. 10 is a diagram illustrating an example of a functional configuration of the test selection section 403 for making a test selection in a prediction phase.

FIG. 11 is a diagram illustrating an application example where a rule is applied to make a test selection in the test selection section 403 depicted in FIG. 10.

FIG. 12 is a diagram illustrating another application example where a rule is applied to make a test selection in the test selection section 403 depicted in FIG. 10.

FIG. 13 is a diagram illustrating an example of a setup file that includes a description regarding the definition of rules.

FIG. 14 is a diagram illustrating an example flow of a software development project including branches.

DESCRIPTION OF EMBODIMENT

Figure 4:
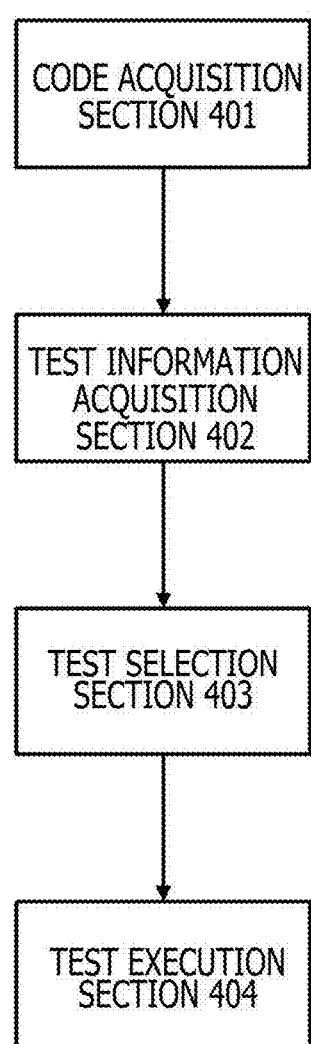
FIG. 4 is a diagram illustrating an example of a functional configuration for conducting a code test.

The present disclosure will now be described in the following order with reference to the accompanying drawings.

A. Overview
B. Code analysis in intermediate state
C. Test code selection
D. Specific example regarding test code selection

A. Overview

In software development, it is preferable that code analysis be performed in a cloud environment where abundant computational resources and functions are available. FIG. 1 schematically illustrates a software development environment 100 that is to provide a code analysis service in the cloud environment. The software development environment 100 may roughly be classified into two types, that is, a local environment 110 and a cloud environment 120. It should be noted that, for simplicity, FIG. 1 depicts only one local environment 110 and only one cloud environment 120. In reality, however, it is assumed that one cloud environment 120 provides a code analysis service to many undepicted local environments.

The local environment 110 corresponds to a software development site, and includes a local PC 111 and a local repository 112. The local PC 111 is used by a developer to perform software development tasks such as source code creation and modification. The local repository 112 is a place where source codes are stored.

Meanwhile, the cloud environment 120 includes a remote repository 121 and a code analysis service section 122. The remote repository 121 is a place for storing the source codes in a cloud. The code analysis service section 122 performs code analysis on the source codes in the remote repository. The code analysis includes, for example, the analysis of a program control flow and structure, class inheritance, and relations between functions and variables and the verification of function vulnerability. However, it is assumed that analysis functions provided by the code analysis service section 122 are not limited to the above-mentioned functions. Further, it is also assumed that it is possible to add functions to codes and change the functions of the codes.

The developer uses the local PC 111 to newly create or edit and update (e.g., add functions to or fix bugs in) a source code, and make version changes associated with frequent source code updates. Storing a source code file edited and updated on the local PC 111 in the local repository 112 is referred to as a "commit." Further, an operation performed to upload a source code from the local environment 110 to the remote repository 121 is also referred to as a "push." Conversely, an operation performed to download a source code from the remote repository 121 is also referred to as a "pull."

Further, in order to maintain the integrity of software currently developed in the software development environment 100, a version control system (VCS) 113 is disposed in the local environment 110. Each time a commit is made to the local repository 112, the version control system 113 issues a commit ID and associates the commit ID with an explanation regarding the contents of the commit, such as function additions, bug fixes, and version maintenance. In a case where a source code is committed to the local repository 112, the source code and historical information regarding the commit associated with the commit ID are both recorded. Moreover, in a case where a source code is uploaded to the remote repository 121, the source code associated with the commit ID is recorded in the remote repository 121.

Additionally, a commit branch function is introduced to concurrently develop multiple versions of software. In a case where the commit branch function is used, it is assumed that the history of commits has a tree structure, and that the local repository 112 manages the history of commits in a tree structure form.

FIG. 14 illustrates an example flow of a software development project including branches. The horizontal axis of FIG. 14 represents a time axis. It is assumed that time flows from left to right. The main body of the software development project is a master branch 1401. On the master branch 1401, the version of software (source code) to be developed is repeatedly changed. Each time the version is changed, a commit is made to the local repository 112, and an upload (push) is made to the remote repository 121. Further, it is expected that a commit is made one or more times within the version. However, a push is not made after each commit. For the purpose, for example, of function additions and bug fixes to the source code, the master branch 1401 is separated into other branches 1402 and 1403. The contents of the resulting branches do not affect the other branches, and relevant work can be performed simultaneously by multiple persons. Furthermore, as long as the history of each branch is stored, encountered problems, such as failures, can easily be isolated and handled. The history of development including commit information (developer, messages, patches, etc.) is recorded, for example, in each repository. It should be noted that, although not depicted in FIG. 14, the branches 1402 and 1403 may be integrated into the master branch 1401 in the future.

Now, the problems to be addressed in a case where code analysis is performed in the cloud environment 120 will be discussed again in detail.

In a case where a code analysis is to be performed in the cloud environment 120, the code analysis is to be performed in the cloud environment 120 on the premise that a file of the source code to be analyzed is already uploaded to the remote repository 121. In this instance, the source code to be uploaded to the remote repository 121 needs to be a final source code including a test code, and the code analysis cannot be performed on a source code that is under development and is in what is generally called an "intermediate state." That is to say, the source code in the "intermediate state," which is committed only to the local repository 112, cannot be code-analyzed in the cloud environment 120. Thus, the code analysis cannot be performed within a short period of time. Consequently, the result of the code analysis cannot be reported to the developer at an early stage.

On the other hand, performing code analysis on the source code in the intermediate state of development is performing code analysis in the local environment 110. Hence, there is a problem of limited available computational resources and functions.

Further, in a case where code analysis is performed on the source code in the intermediate state of development, it is necessary to properly and efficiently select a required test code according to a modified portion of the source code, and conduct an adequate test.

B. Code Analysis in Intermediate State

FIG. 2 illustrates a procedure performed in the software development environment 100 to perform code analysis on a source code that is still not uploaded to the remote repository 121 and is in the intermediate state of development. The procedure for performing the code analysis is described below with reference to an example where a code analysis process is started each time the developer of software commits the source code.

The developer of software makes a commit on the source code that is edited and updated on the local PC 111. In response to this, the version control system 113 issues a new commit ID, and records the description regarding the contents of the commit in association with the commit ID. Subsequently, the source code edited and updated on the local PC 111 is associated with the issued commit ID, and stored in the local repository 112.

The version control system 113 generates a commit event upon the issuance of the new commit ID. In response to the generated commit event, a commit information acquisition section 114 verifies the latest commit ID in the local environment 110, which is the commit ID of the source code to be analyzed.

Next, the commit information acquisition section 114 checks the source codes stored in the remote repository 121, and verifies the latest commit ID that is historically associated with the source code to be analyzed.

Next, the commit information acquisition section 114 refers to the historical information regarding the commits managed in the version control system 113, to find a branch (fork point) between the latest commit ID in the local environment 110 and the latest commit ID in the remote environment 120, and creates a list of commits required for reproducing the latest commit ID in the local environment 110 from the commit ID of the found branch. This list of commits is equivalent to a list of commits that are still not pushed to the remote repository 121.

Subsequently, as regards the individual commits in the created commit list, the commit information acquisition section 114 acquires, from the local environment 110 (more specifically, from the local repository 112 or the like), the commit information including, for example, the information regarding the developer, commit-related messages, and patches, and transmits the acquired commit information to the code analysis service section 122 in the cloud environment 120.

In response to this, upon acquiring (downloading) the latest code from the remote repository 121 that corresponds to the source code to be analyzed, the code analysis service section 122 reproduces the latest source code in the intermediate state, which is to be analyzed, in reference to the commit information received from the commit information acquisition section 114.

Subsequently, the code analysis service section 122 performs the code analysis process on the reproduced source code, and transmits an analysis result report regarding the result of the code analysis process to the local PC 111.

Consequently, following the procedure depicted in FIG. 2 makes it possible to perform the code analysis on the source code in the "intermediate state," which is committed only to the local repository 112, and report the result of the code analysis to the developer at an early stage.

It should be noted that the version control system 113 depicted in FIGS. 1 and 2 is, for example, configured as a Git or other decentralized version control system that records and tracks the history of source code changes.

Further, the commit information acquisition section 114 includes, for example, a Shell Script or other script that is called at a stage where a commit is created by the version control system 113, and transmits information required for source code reproduction to the cloud (code analysis service section 122).

Further, the code analysis service section 122 provides an actual service for performing code analysis, such as Rocro's Inspecode, for example. In the software development environment 100 depicted in FIG. 2, the code analysis service section 122 reproduces a code equivalent to a code in the local environment.

Moreover, the remote repository 121 corresponds, for example, to a git server disposed in the cloud environment 120 or to a web service (GitHub) having the VCS function.

FIG. 3 is a flowchart illustrating a procedure performed in the software development environment 100 to perform code analysis on a source code that is in the intermediate state of development.

When a commit is made on a source code that is edited and updated on the local PC 111 ("YES" in step S301), the version control system 113 issues a new commit ID. Additionally, the version control system 113 records the description regarding the contents of the commit in association with the issued commit ID.

In response to a commit event generated upon the issuance of the new commit ID, the commit information acquisition section 114 verifies, in the version control system 113, the latest commit ID in the local environment 110, which is the commit ID of the source code to be analyzed (step S302).

Next, the commit information acquisition section 114 checks the source codes stored in the remote repository 121, and verifies the latest commit ID that is historically associated with the source code to be analyzed (step S303).

Next, the commit information acquisition section 114 refers to the historical information regarding the codes managed in the local repository 112 or the version control system 113, to find a branch (fork point) between the latest commit ID in the local environment 110 and the latest commit ID in the remote environment 120 (step S304).

Next, the commit information acquisition section 114 creates a list of commits required for reproducing the latest commit ID in the local environment 110 from the commit ID of the found branch, that is, a list of commits that are still not pushed to the remote repository 121 (step S305).

Subsequently, the commit information acquisition section 114 acquires the commit information regarding the individual commits in the created commit list, and transmits the acquired commit information to the code analysis service section 122 in the cloud environment 120 (step S306).

In reference to the commit information received from the commit information acquisition section 114, the code analysis service section 122 reproduces the contents of the latest commit in the local environment 110, that is, the latest source code in the intermediate state (step S307).

Next, the code analysis service section 122 performs the code analysis process on the reproduced source code (step S308). Subsequently, the code analysis service section 122 transmits an analysis result report regarding the reproduced latest source code to the local PC 111 (step S309), and terminates the present process.

As described above, the local environment 110 is able to identify difference information regarding the difference between the latest commit in the local environment 110 and the latest commit in the remote environment 120 in reference to the historical information regarding the commits managed, for example, by the version control system 113, and provide the identified difference information to the remote environment 120. Meanwhile, allowing the code analysis service section 122 to achieve source code reproduction in reference to the difference information provided from the local environment 110 makes it possible for the remote environment 120 to implement the code analysis service for a source code that is still not uploaded to the remote repository 121 and is in the intermediate state.

C. Test Code Selection

Adopting a code analysis method described under item B above makes it possible to test a source code in the intermediate state, that is, under development, before the source code is uploaded to the remote repository 121. Consequently, it is further demanded that the length of time required for frequent test execution be reduced.

If, for each code analysis (e.g., for each code analysis performed on an individual commit basis), the code analysis service section 122 executes all the test codes predefined with respect to the source code to be analyzed, the length of time required for test execution increases. Therefore, it is preferable that some of the test codes be adaptively selected for test execution instead of all the test codes being executed for each code analysis.

FIG. 4 schematically illustrates an example of a functional configuration for conducting a code test in the code analysis service section 122. Individual functional blocks are described below.

A code acquisition section 401 acquires a source code that is targeted for code analysis (or testing). Here, the source code is assumed to be the latest source code that is reproduced in the code analysis service section 122 in accordance with a processing flow depicted in FIG. 2.

A test information acquisition section 402 acquires information (e.g., test target file name) regarding all the test codes that are predefined with respect to the source code targeted for testing. For example, the file names of test codes to be applied to the source code are written in the source code, and the test information acquisition section 402 acquires the information regarding the test codes from within the source code. As a matter of course, the information regarding the test codes defined for each source code may be stored in a place other than the location of the source code.

A test selection section 403 selects a test code that should be used for testing this time. This test code selection is made from all the test codes that are acquired by the test information acquisition section 402 and predefined with respect to the source code. Further, a test execution section 404 tests the source code by using the test code selected by the test selection section 404. A test result obtained by the test execution section 404 is reported, for example, to the developer together with other code analysis results obtained by the code analysis service section 122.

As described above, it is preferable that the test selection section 403 adaptively select some of the test codes for test execution instead of allowing all the test codes to be executed each time.

For example, methods of selecting the test codes by using a machine learning model are proposed (refer to NPL 1 and NPL 2).

Proposed in NPL 1 is a method of creating a machine learning model by extracting a feature amount from a modified source code (changed file), a test code, and information regarding both the modified source code (changed file) and the test code, and selecting a test code having a high probability of failure with respect to the changed file, by using the created machine learning model. According to NPL 1, source code management is exercised in such a manner that only source codes having succeeded in a test are registered in a repository, and that modifications failing in the test are not introduced as a source code. Specifically, NPL 1 possibly assumes that codes failing in the test are not included in the repository, and that test execution results are separately stored for generating a dataset for use in machine learning. Thus, it is confirmed that a file change by a commit causes a test failure (it is possible that, in a case where source codes having failed in the test already exist in the repository, a test failure occurs due to an old commit other than the file change by the commit). Stated differently, according to NPL 1, a previous failed test code might not be executed for the changed file. Further, NPL 1 states that all the tests are regularly conducted without making a test selection.

Meanwhile, NPL 2 states that a test code selection is made for a source code by using a machine learning model, as is the case with NPL 1. The method described in NPL 2 simultaneously conducts a source code test on a certain number of file changes. This results in a state where test results are unknown. NPL 2 states that a test selection is evaluated by creation of a model after each change in the test result transition, for example, from succeeded to failed, from succeeded to unimplemented, and from unimplemented to failed.

Figure 5:
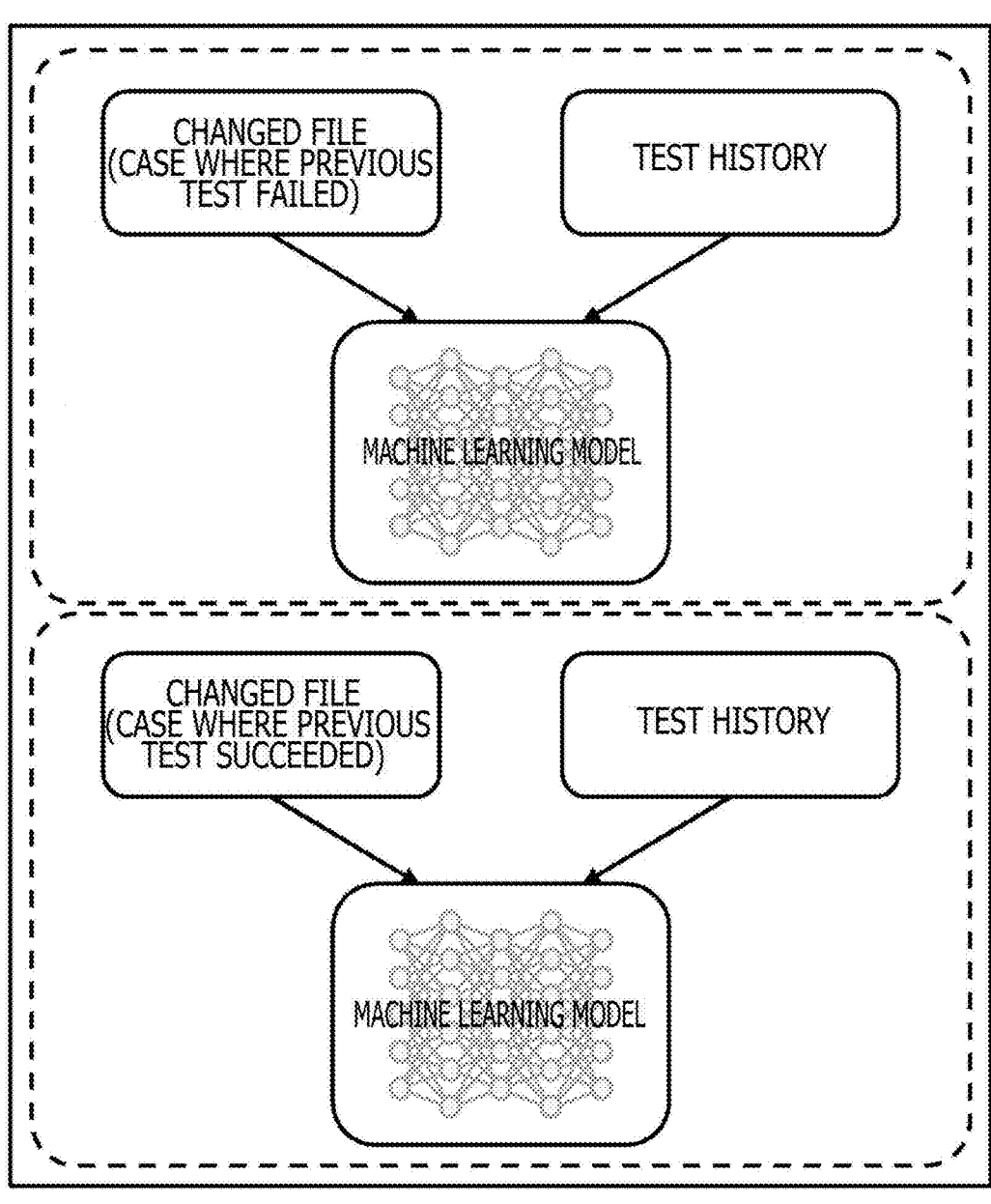
FIG. 5 is a diagram illustrating an example of making a test selection according to a machine learning model.

A possible method is to create a machine learning model for selecting an appropriate test code from a changed file modified by the developer, by using the changed file and a test history (indicating whether the testing of a test code succeeded or failed) as learning data. In the above case, if the source code (file) is modified after a test failure, the machine learning model created as described above cannot be used for test selection. Thus, it is necessary not only to create a machine learning model by using the changed file modified by the developer in a case of a preceding failure of testing and the test history as the learning data, but also to create an additional machine learning model by using the changed file modified by the developer in a case of a preceding success of testing and the test history as the learning data. Consequently, two different machine learning models need to be created as described above (see FIG. 5). It is troublesome to create such two different machine learning models.

In view of the above circumstances, the present disclosure proposes a simplified test selection method by combining prediction by a machine learning model and rule-based selection.

Figure 6:
FIG. 6 is a diagram illustrating an example of an internal configuration of a test selection section 403.

FIG. 6 illustrates an example of an internal configuration of the test selection section 403, which is depicted in a functional block diagram of FIG. 4 and configured according to the present disclosure.

A machine learning model 601 has learned, in advance, a changed file derived from source code modification and a previous test history. Having learned the changed file and the previous test history, the machine learning model 601 predicts one or more test codes appropriate for the changed file derived from source code modification.

An evaluation section 602 evaluates the one or more test codes predicted by the machine learning model 601, in accordance with a predetermined rule, and outputs one or more test codes to be executed for the changed file, as a final test selection result.

As indicated in FIG. 6, the test selection section 403 is configured such that a test selection is made based not only on the prediction by the machine learning model 601 and that a rule-based test selection can be made. Accordingly, for example, by applying a rule for preferentially conducting a previous failed test in the evaluation section 602, it is possible to implement an operation for preferentially selecting a previous failed test and conducting the selected previous failed test on a changed file that has failed in a previous test.

According to the configuration depicted in FIG. 6, one machine learning model will suffice for test selection. This facilitates management and calibration (model relearning).

It is possible that rules (1) to (3), which are described below, may additionally be applied in the evaluation section 602.

(1) Rule Based on a Branch Name

For example, as regards a repository for the master branch, a rule for selecting all tests instead of making a test selection is prepared. When this rule is applied, it is not necessary to conduct all the tests on a regular basis as described in NPL 1, and it is possible to implement an operation for conducting all the tests only on necessary branches.

(2) Rule for Adjusting a Test Selection Rate for Continuous Integration (CI) with Respect to a Specific Branch Name

Continuous integration is a software development method for automatically performing the process of building and testing by automating a software development process and thus allowing the developer to commit a source code and merge the committed source code into a shared repository. When this rule is applied, it is possible to avoid false negatives in test selection.

(3) Rule for Giving Preference to a Specific Test

Preference can be given to a specific test by adding an offset to the result of prediction by the machine learning model 601. Whether the test is specific or not can be identified in reference to, for example, the character string of a test target file name.

In a case where multiple rules are prepared, conditions may be preset for each rule, and a test selection may be made by application of a rule matching the conditions.

FIG. 7 illustrates an example of a functional configuration of the test selection section 403 that is configured to make a test selection in accordance with a rule matching the conditions. However, the same component elements as those depicted in FIG. 6 are designated by the same reference signs as in FIG. 6.

The multiple rules to be applied in the case of test code selection are accumulated in a rule accumulation section 702. The conditions for rule application are set for each rule. When a test selection is to be made, a rule read-out section 701 reads out a rule matching the conditions from the rule accumulation section 702.

Subsequently, the evaluation section 602 evaluates one or more test codes predicted by the machine learning model 601, in accordance with the rule read out by the rule read-out section 701, and outputs one or more test codes to be executed for the present changed file as the final test selection result. An operation defined by a rule is, for example, adjusting a predicted preference or adjusting the test selection rate. The evaluation section 602 selects the test selection rate in reference to the rule matching the conditions, and selects a test according to a test failure prediction value.

It should be noted that, in a case where the rule read-out section 701 cannot read out a rule matching the conditions from the rule accumulation section 702 (i.e., in a case where no existing rules match the conditions), the evaluation section 602 does not evaluate, in reference to the rules, the test codes predicted by the machine learning model 601, but uses the result of prediction by the machine learning model 601 on an as-is basis and outputs that result of prediction as the final test selection result.

D. Specific Example Regarding Test Code Selection

Here, under item D, a specific example regarding a test code selection is described.

D-1. Test Selection Method

It is desirable that only a test identified as having a high probability of failure be selectively conducted with use of a changed file (source code), without wastefully conducting a test identified as having a high probability of success. FIG. 8 illustrates an example of making a test selection based on the probability of failure. The upper part of FIG. 8 indicates the results of calculations performed with use of a predetermined algorithm in order to determine the probability of failure of an analysis target file (source code) in each test code (test target file). Meanwhile, the lower part of FIG. 8 indicates that a subset including two test target files identified as having a high probability of failure, namely, aaa/eee_test.go and aaa/fff/ggg_test.go, is consequently selected from defined test target files.

D-2. Learning Phase

In a learning phase of the machine learning model 601, a machine learning model is learned from the feature amount extracted from a changed file obtained by modifying the source code and metadata concerning a test target file and from a test target history (test results). By using the machine learning model learned in the above manner, the probability of test failure regarding each test target file can be predicted.

D-3. Feature Amount Generation

As the feature amounts to be used for learning of the machine learning model 601, the following four feature amounts, (1) to (4), may be enumerated.

(1) Number of changes applied to a changed file over the last 14 days (2) Probability of test target file failure over the last 14 days (3) Degree of file path match between a changed file and a test target file (4) Generating a model by causing a list of IDs and values of feature amounts with respect to a test target file and the result of testing of the test target file to be learned as the learning data D-4. Feature Amount Generation A list of files changed between two commits regarding the number of changes applied to the changed file over the last 14 days can be obtained from the repository as indicated below.

```
$ git diff--numstat--name-only
    commit1commit2server/fronteneteports/filea.go
    server/frontend/reportsfUtils.go server/storage/
    coverage.go                                [Math. 1]
```

Further, the date and time of commit creation can be obtained as indicated below.

```
$ git show--format="% ai" commit1 2017-02-1701:
    23:35+0900                                 [Math. 2]
```

Further, the number of commits with respect to each changed file over the last 14 days can be obtained as indicated below.

```
$ git log--format=online--before="14 days before
    commit creation"--after="commit creation date
    and time" server/backend/unregister.go|wc-|   [Math. 3]
```

Subsequently, a list of the feature amounts is created by joining the ID and value of each feature amount with a colon.

D-5. Model Learning

For each test target file, a list indicating one-line label plus the feature amount ID and value in the LibSVM (Library for Support Vector Machines) format is generated as indicated below. It should be noted that the LibSVM format is a file format for feature vectors required as the learning data in many machine learning libraries.

```
0 100:16.00 101:117.00 102:254.00 110:35.00 120:
    8.00 130:6650757.00 140:12.00 200:0.00 201:
    0.00 202:0.00 203:0.00 210:1.00 211:1.00 220:
    1.00 300:0.00 310:9.00 311:0.22 0 100:16.00
    101:117.00 102:254.00 110:35.00 120:8.00 130:
    8650757.00 140:12.00 200:0.00 201:0.00 202:
    0.00 203:0.00 210:2.00 211:4.00 220:10.00 300:
    0.00 310:9.00 311:0.22 1 100:16.00 101:117.00
    102:254.00 110:35.00 120:8.00 130:8650757.00
    140:12.00 200:0.08 201:0.02 202:0.01 203:0.01
    210:3.00 211:5.00 220:10.00 300:0.00 310:9.00
    311:0.27 1 100:16.00 101:117.00 102:254.00
    110:35.00 120:8.00 130:8650757.00 140:12.00
```

200:0.08 201:0.02 202:0.01 203:0.01 210:3.00
211:6.00 220:10.00 300:0.00 310:9.00 311:0.27    [Math. 4]

In each entry in the above list, the first digit is a label. A label of 0 indicates that a test succeeded, whereas a label of 1 indicates that a test failed.

In reference to the above learning data, a model is created by use of a Boosted Decision Tree (boosting decision tree). The model created here is then used to predict the failure of each test target file.

D-6. Prediction Phase

In a prediction phase, a list of feature amounts is created from files changed at the time of requesting for pushing the source code to or pulling the source code from the remote repository 121 and from the test target files, and then the above-mentioned learned model is used to predict the failure of each test target file from the list of feature amounts.

100:16.00 101:117.00 102:254.00 110:35.00 120:
8.00 130:8650757.00 140:12.00 200:0.00 201:
0.00 202:0.00 203:0.00 210:1.00 211:1.00 220:
1.00 300:0.00 310:9.00 311:0.22    [Math. 5]

From the learned model, a failure prediction score value between 0 and 1 is outputted for each test target file. The evaluation section 602 selects a subset of test target files according to the test selection rate or a score threshold.

D-7. Problems

The probability of failure in the testing of a changed file can be predicted by use of the learned machine learning model 601. However, in a case where the changed file is not obtained by modifying a portion of the source code that caused the failure in a previous test, the probability of a repeated failure in the previous failed test cannot be predicted by use of the machine learning model 601.

The technology described in NPL 1 does not create the above situation, that is, does not cope with the above situation. Further, the method described in NPL 2 creates a learning model for each type of Transition. Accordingly, since learning models need to be collected for individual models, significant bother is caused, and management and calibration are difficult to achieve.

Meanwhile, the present disclosure is able to set a high probability of failure for a previous failed test by applying a rule for adding an offset to the result of prediction by the machine learning model 601.

D-8. Functional Configuration

FIG. 9 illustrates an example of a functional configuration of the test selection section 403 in a learning phase for generating the machine learning model.

When a dataset including the metadata of the source code and the results of previous testing (test history) is read out as the learning data from the repository, a feature amount generation section 901 generates a feature vector file from the dataset. The feature vector file is in the LibSVM format and is to be inputted to a model generation section 902. The model generation section 902 includes a Gradient Boosting Framework, conducts learning by using the above-mentioned dataset, and generates a machine learning model 903 that predicts the probability of test failure from the metadata of the source code and the results of previous testing.

FIG. 10 illustrates an example of a functional configuration of the test selection section 403 for making a test selection in the prediction phase. In the prediction phase, the machine learning model generated in the learning phase depicted in FIG. 9 is used. The test selection is made in an event where the source code of software is changed.

A feature amount generation section 1001 generates a feature vector file from a dataset including the metadata of the modified source code and the results of previous testing (test history). The above-mentioned feature vector file is in the LibSVM format and is to be inputted to the learned machine learning model.

A prediction score generation section 1002 generates a failure prediction score of a test of the modified source code (changed file) from the inputted feature vector file in the LibSVM format by using the machine learning model 903 generated in the learning phase depicted in FIG. 9.

Meanwhile, a comparison section 1003 outputs a rule matching the conditions, by comparing the state of a previous test (succeeded or failed), the branch name of the source code to be tested, and the test target described in the source code.

A manipulation section 1004 manipulates the failure prediction score for each test code that is generated by the prediction score generation section and the test selection rate as well. Further, in reference to the result of such manipulation, a final selection section 1005 finally selects the test code to be executed with respect to a target source code.

FIG. 11 illustrates a specific application example where a rule is applied to make a test selection in the test selection section 403 depicted in FIG. 10. Here, it is assumed that the applied rule is for adding an offset based on the state of a previous test to the failure prediction score.

The feature amount generation section 1001 generates the feature vector file from a dataset including the metadata of the modified source code and the results of previous testing (test history). The feature vector file is in the LibSVM format and is to be inputted to the learned machine learning model. Subsequently, the prediction score generation section 1002 generates the failure prediction score of a test of the changed file from the inputted feature vector file in the LibSVM format. In this instance, in a case where the changes in the changed file are irrelevant to the test, the failure prediction score is predicted to be 0.1.

Meanwhile, the comparison section 1003 compares the above rule with the state of the previous test. In this instance, since the state of the previous test is Failed, the comparison section 1003 outputs a rule that matches the conditions and adds 0.8 to the failure prediction score of the test.

Accordingly, the manipulation section 1004 applies a rule for adding 0.8 to the failure prediction score of a previous failed test, which is 0.1, and thus sets the failure prediction score of the test to 0.9.

Consequently, although the test target is irrelevant to the changed file, an offset is added because the test target is in a state where it failed in the previous test. As a result, since the failure prediction score turns out to be as high as 0.9, the final selection section 1005 selects the test target.

FIG. 12 illustrates another application example where a rule is applied to make a test selection in the test selection section 403 depicted in FIG. 10. Here, it is assumed that a rule for selecting all tests is applied to a repository for the master branch.

The feature amount generation section 1001 generates the feature vector file from a dataset including the metadata of the modified source code and the results of previous testing (test history). The feature vector file is in the LibSVM format and is to be inputted to the learned machine learning model. Subsequently, the prediction score generation section 1002 generates the failure prediction score of a test of the changed file from the inputted feature vector file in the LibSVM format.

Meanwhile, the comparison section 1003 compares the above rule with the state of the previous test. In this instance, since the branch name of the inputted source code is checked and found to be master that matches the conditions, the comparison section 1003 outputs a rule for selecting all tests, that is, setting the selection rate to 100%.

Accordingly, the manipulation section 1004 sets a selection rate of 100% in the final selection section 1005. As a result, the final selection section 1005 selects all test targets without regard to the value of the score predicted by the prediction score generation section 1002.

It should be noted that a user (e.g., source code developer or administrator) may be allowed to select the rule to be applied in the test selection section 403, by performing a UI (User Interface) operation.

For example, as indicated in FIG. 13, a description regarding the definition of rules applicable to test selection may be added to a setup file in a yami (YAML Ain't Markup Language) format. In an example of the definition depicted in FIG. 13, a rule name (name), a rule application condition (condition), and an operation (action) to be applied are described for each rule. For example, at the beginning of code analysis, an UI screen (not depicted) listing the names of rules may be displayed to prompt the user to designate the rule to be applied to test selection.

INDUSTRIAL APPLICABILITY

The present disclosure has been described above in detail with reference to a specific embodiment. However, it is obvious that a person skilled in the art is able to modify or change the specific embodiment without departing from the spirit and scope of the present disclosure.

According to the present disclosure, a code analysis service provided in the cloud can be used, for example, to perform code analysis on a source code in the intermediate state on an individual commit basis and report a code analysis result to a developer at an early stage. Since the code analysis service provided in the cloud is used, the code analysis can be performed at an early stage of a code development process without limitations on available computational resources and functions. It is obvious that a similar code analysis service can be provided in a local environment.

Stated differently, the present disclosure has been described in an illustrative manner. Hence, the description in this document should not be interpreted in a restrictive manner. The scope of the appended claims should be considered to comprehend the spirit of the present disclosure.

It should be noted that the present disclosure may also adopt the following configurations.

(1)

An information processing device including:

a difference information acquisition section that acquires difference information regarding a difference between a code stored in a first repository and a code stored in a second repository in correspondence with the code stored in the first repository; and a code analysis section that reproduces the code stored in the first repository from the code stored in the second repository, in reference to the difference information, and performs code analysis on the reproduced code.

(2)

The information processing device according to (1) above, in which a result of analysis by the code analysis section is reported to a developer of the code.

(3)

The information processing device according to (1) or (2) above, in which the difference information acquisition section acquires the difference information in reference to a list of commits not yet pushed to the second repository.

(4)

The information processing device according to (3) above, in which, in a case where there is a branch in a code history, the difference information acquisition section acquires the difference information in reference to a list of commits necessary for reproducing the code in a latest form that is stored in the first repository from the branch.

(5)

The information processing device according to (4) above, in which the code analysis section reproduces the code in the latest form stored in the first repository, in reference to information regarding each commit included in the list of commits, and performs code analysis on the reproduced latest code.

(6)

The information processing device according to any one of (1) through (5) above, in which the code analysis section conducts a test by using a test code that is selected from multiple test codes defined with respect to the code.

(7)

The information processing device according to (6) above, in which the code analysis section makes a test code selection by using a machine learning model that has learned a history of changed files derived from code modification and tests based on test codes.

(8)

The information processing device according to (7) above, in which the code analysis section makes a test code selection by applying rules to a result of prediction by the machine learning model.

(9)

The information processing device according to (8) above, in which the rules include at least one of the following rules:

(a) a rule for preferentially conducting a previous failed test;

(b) a rule for conducting all tests according to a branch name;

(c) a rule for adjusting a test selection rate for continuous integration with respect to a specific branch name; or (d) a rule for giving preference to a specific test.

(10)

The information processing device according to (8) or (9) above, in which conditions are set for each of multiple rules, and the code analysis section makes a test code selection by applying rules matching the conditions to the result of prediction by the machine learning model.

(11)

An information processing method including:

a difference information acquisition step of acquiring difference information regarding a difference between a code stored in a first repository and a code stored in a second repository in correspondence with the code stored in the first repository; and a code analysis step of reproducing the code stored in the first repository from the code stored in the second repository, in reference to the difference information, and performing code analysis on the reproduced code.

(12)

A computer program written in a computer-readable format for causing a computer to function as:

a difference information acquisition section that acquires difference information regarding a difference between a code stored in a first repository and a code stored in a second repository in correspondence with the code stored in the first repository; and a code analysis section that reproduces the code stored in the first repository from the code stored in the second repository, in reference to the difference information, and performs code analysis on the reproduced code.

(13)

An information processing system including:

a commit information acquisition device that acquires commit information regarding a commit that represents a difference between a latest code developed in a local environment and a code corresponding to the code pushed to a remote repository; and a code analysis device that reproduces the latest code from a code pushed to the remote repository, in reference to the commit information acquired by the commit information acquisition device, and performs code analysis on the reproduced code.

REFERENCE SIGNS LIST

100: Software development environment
110: Local environment
111: Local PC
112: Local repository
113: Version control system
114: Commit information acquisition section
120: Cloud environment
121: Remote repository
123: Code analysis service section
401: Code acquisition section
402: Test information acquisition section
403: Test selection section
404: Test execution section
601: Machine learning model
602: Evaluation section
701: Rule read-out section
702: Rule accumulation section
901: Feature amount generation section
902: Model generation section
903: Machine learning model
1001: Feature amount generation section
1002: Prediction score generation section
1003: Comparison section
1004: Manipulation section
1005: Final selection section

The invention claimed is:

1. An information processing device, comprising:

a central processing unit (CPU) configured to:

acquire difference information that is associated with a difference between a first code and a second code, wherein a first repository stores the first code, and a second repository stores the second code in correspondence with the first code;

reproduce, based on the difference information, the first code from the second code;

generate a feature vector file based on metadata of the reproduced first code and a test history, wherein test history is associated with the first code;

generate, based on the feature vector file, a machine learning model;

generate, based on the machine learning model, a plurality of failure prediction scores for each test code of a plurality of test codes;

select, based on the plurality of failure prediction scores, a test code of the plurality of test codes;

execute the selected test code with respect to the reproduced first code; and generate a result of analysis based on the executed selected test code.

2. The information processing device according to claim 1, wherein the CPU is further configured to transmit the result of the analysis to a developer of the reproduced first code.

3. The information processing device according to claim 1, wherein the CPU is further configured to acquire the difference information that includes a first list of commits, and the first list of commits is not pushed to the second repository.

4. The information processing device according to claim 3, wherein based on a branch in a code history, the CPU is further configured to acquire the difference information that includes a second list of commits, the second list of commits is associated with the reproduction of the first code in a latest form, and the reproduced first code is stored in the first repository from the branch.

5. The information processing device according to claim 4, wherein the CPU is further configured to:

reproduce, based on specific information associated with each commit of the second list of commits, the first code that is stored in the first repository, wherein the first code is in the latest form; and perform a code analysis process on the reproduced first code.

6. The information processing device according to claim 1, wherein the selected test code is associated with the first code.

7. The information processing device according to claim 6, wherein the CPU is further configured to select the test code based on the machine learning model, and the machine learning model is associated with the test history of a plurality of changed files, the test history of the plurality of changed files is derived from each of a code modification and a plurality of tests, and the plurality of tests is based on the plurality of test codes.

8. The information processing device according to claim 7, wherein the CPU is further configured to:

apply a plurality of rules to a result of prediction by the machine learning model; and select, based on the applied plurality of rules, the test code of the plurality of test codes.

9. The information processing device according to claim 8, wherein the plurality of rules includes at least one of:

a rule to conduct a previous failed test;

a rule to conduct the plurality of tests based on a first branch name;

a rule to adjust a test selection rate for continuous integration with respect to a second branch name; or a rule to give preference to a specific test of the plurality of tests.

10. The information processing device according to claim 8, wherein a plurality of conditions is set for each rule of the plurality of rules, and the CPU is further configured to:

apply a set of rules of the plurality of rules to the result of prediction, wherein the set of rules matches with the plurality of conditions; and select, based on the applied set of rules, the test code of the plurality of test codes.

11. An information processing method, comprising:

in an information processing device:

acquiring difference information that is associated with a difference between a first code and a second code, wherein a first repository stores the first code, and a second repository stores the second code in correspondence with the first code;

reproducing, based on the difference information, the first code from the second code;

generating a feature vector file based on metadata of the reproduced first code and a test history, wherein the test history is associated with the first code;

generating, based on the feature vector file, a machine learning model;

generating, based on the machine learning model, a plurality of failure prediction scores for each of test code of a plurality of test codes;

selecting, based on the plurality of failure prediction scores, a test code of the plurality of test codes;

executing the selected test code with respect to the reproduced first code; and generating a result of analysis based on the executed selected test code.

12. A non-transitory computer-readable medium having storage thereon, computer-executable instructions which, when executed by a computer, cause the computer to execute operations, the operations comprising:

acquiring difference information that is associated with a difference between a first code and a second code, wherein a first repository stores the first code, and a second repository stores the second code in correspondence with the first code; and reproducing, based on the difference information, the first code from the second code;

generating a feature vector file based on metadata of the reproduced first code and test history, wherein the test history is associated with the first code;

generating, based on the feature vector file, a machine learning model;

generating, based on the machine learning model, a plurality of failure prediction scores for each test code of a plurality of test codes;

selecting, based on the plurality of failure prediction scores, a test code of the plurality of test codes;

executing the selected test code with respect to the reproduced first code; and generating a result of analysis based on the executed selected test code.

13. An information processing system, comprising:

a commit information acquisition device that includes a first central processing unit (CPU) configured to acquire commit information that is associated with a commit, wherein the commit represents a difference between a latest first code developed in a local environment and a second code that is pushed to a remote repository; and a code analysis device that includes a second CPU configured to:

reproduce, based on the commit information, the first code from the second code;

generate a feature vector file based on metadata of the reproduced first code and test history, wherein the test history is associated with the first code;

generate, based on the feature vector file, machine learning model;

generate, based on the machine learning model, a plurality of failure prediction scores for each test code of a plurality of test codes;

select, based on the plurality of failure prediction scores, a test code of the plurality of test codes;

execute the selected test code with respect to the reproduced first code; and generate a result of analysis based on the executed selected test code.

* * * * *